(12) United States Patent
Shim et al.

(10) Patent No.: US 12,235,713 B2
(45) Date of Patent: Feb. 25, 2025

(54) METHOD FOR OPERATING STORAGE DEVICE AND HOST DEVICE, AND STORAGE DEVICE

(71) Applicant: SAMSUNG ELECTRONICS CO., LTD., Suwon-si (KR)

(72) Inventors: Young-Seop Shim, Seoul (KR); Kyung Duk Lee, Seoul (KR); Jong-Sung Na, Hwaseong-si (KR); Chan Moo Park, Seoul (KR); In Kap Chang, Suwon-si (KR); Chang Min Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 17/376,441

(22) Filed: Jul. 15, 2021

(65) Prior Publication Data

US 2022/0179724 A1 Jun. 9, 2022

(30) Foreign Application Priority Data

Dec. 8, 2020 (KR) .................. 10-2020-0170198

(51) Int. Cl.
*G06F 11/00* (2006.01)
*G06F 17/18* (2006.01)
*G06N 20/00* (2019.01)

(52) U.S. Cl.
CPC .......... *G06F 11/008* (2013.01); *G06F 17/18* (2013.01); *G06N 20/00* (2019.01)

(58) Field of Classification Search
CPC ............. G06F 11/008; G06F 11/3034; G06F 11/3072; G06F 11/3055; G06F 11/1004; G06F 11/1068; G06F 11/1092; G06F 11/3037; G06F 11/3065; G06F 11/1024; G06F 17/18; G06F 13/1673;
(Continued)

(56) References Cited

U.S. PATENT DOCUMENTS 6,934,673 B2 * 8/2005 Alvarez ............... G06F 11/008
702/182
7,539,907 B1 * 5/2009 Johnsen ............... G06F 11/008
714/26

(Continued)

FOREIGN PATENT DOCUMENTS

KR    10-1316918 B1   10/2013
KR    10-1317763 B1   10/2013
WO    WO-2020202636 A1 * 10/2020 ........... G06F 18/214

OTHER PUBLICATIONS

Information Processing Method and Information Processing System (translated/non-translated WO 2020202636 A1) (Year: 2020).*

*Primary Examiner* — Matthew M Kim
*Assistant Examiner* — Matthew N Putaraksa
(74) *Attorney, Agent, or Firm* — Sughrue Mion, PLLC

(57) ABSTRACT

A method for operating a storage device capable of improving reliability of a memory system is provided. The method includes providing a storage device which includes a first component and a second component; receiving, via a host interface of the storage device, a command for requesting failure possibility information about the storage device from an external device; and providing, via the host interface, the failure possibility information about the storage device to the external device in response to the command.

20 Claims, 14 Drawing Sheets

(58) Field of Classification Search
CPC .... G06F 3/0653; G06F 3/0614; G06F 3/0656; G06F 3/0659; G06N 20/00; G06N 3/08
See application file for complete search history.

(56) References Cited

U.S. PATENT DOCUMENTS

| | | | |
|---|---|---|---|
| 9,002,775 B1* | 4/2015 | Harrison | G06N 20/00 706/52 |
| 10,216,558 B1 | 2/2019 | Gaber et al. | |
| 10,289,509 B2 | 5/2019 | Xu et al. | |
| 10,613,962 B1 | 4/2020 | Delange | |
| 10,726,930 B2 | 7/2020 | Sarkar et al. | |
| 11,493,548 B2* | 11/2022 | Ahmed | G01R 31/2642 |
| 2004/0230874 A1* | 11/2004 | Prang | G06F 11/3636 714/39 |
| 2008/0250265 A1* | 10/2008 | Chang | H04L 41/0663 714/4.12 |
| 2018/0284989 A1* | 10/2018 | Kachare | G06F 13/28 |
| 2019/0108888 A1* | 4/2019 | Sarkar | G06N 20/00 |
| 2019/0179694 A1* | 6/2019 | Park | G06F 11/0787 |
| 2019/0369911 A1* | 12/2019 | Rai | G06F 3/0679 |
| 2020/0053112 A1* | 2/2020 | Torisaki | H04L 63/1458 |
| 2020/0104200 A1 | 4/2020 | Kocberber et al. | |
| 2020/0133758 A1 | 4/2020 | Liu et al. | |
| 2020/0233587 A1 | 7/2020 | Liu et al. | |
| 2020/0409809 A1* | 12/2020 | Liu | G06F 11/1662 |
| 2022/0012143 A1* | 1/2022 | Meeran | G06F 11/0772 |
| 2022/0038330 A1* | 2/2022 | Dutta | H04L 41/147 |
| 2022/0083496 A1* | 3/2022 | Subbiah | G06F 13/1668 |
| 2022/0086529 A1* | 3/2022 | Gowda | H04N 21/4665 |
| 2022/0137859 A1* | 5/2022 | Ahn | G06F 3/0679 711/154 |
| 2022/0139541 A1* | 5/2022 | Korst | G16H 40/60 705/2 |
| 2022/0182809 A1* | 6/2022 | Long | H04W 8/06 |
| 2022/0229720 A1* | 7/2022 | Kantharaj | G06F 11/3476 |
| 2023/0060352 A1* | 3/2023 | Lewis | G06F 18/241 |
| 2023/0083443 A1* | 3/2023 | Saveliev | G06N 20/00 726/23 |
| 2023/0104543 A1* | 4/2023 | Gandikota | G06N 5/04 700/28 |
| 2023/0289059 A1* | 9/2023 | Park | G06F 3/0616 |
| 2024/0086269 A1* | 3/2024 | Sun | G06F 11/1441 |

* cited by examiner

FIG. 7

| Components | Log Data |
|---|---|
| NAND | Reclaim count |
| | Read Latency Histogram |
| | Read Retry count |
| | RTBB per die count |
| | Available die count |
| | UECC count |
| DRAM | DRAM CECC Count |
| | Temp history |
| Hardware | Capacitor Health |
| | Temp Sensor Retry count |
| | CRC Error History |
| Firmware | Exception count |
| | Reset count |

FIG. 10

Time Series Failure Possibility Matrix

Components (m)

$$\text{Time (n)} \begin{bmatrix} FP(t+n) & \cdots & FP(t+n) \\ \vdots & \ddots & \vdots \\ FP(t+n) & \cdots & FP(t+n) \end{bmatrix} \cdot \begin{bmatrix} W_{NAND} \\ W_{Cap} \\ \vdots \\ \vdots \\ W_{DRAM} \end{bmatrix} = \begin{bmatrix} Status_{t+1} \\ Status_{t+2} \\ \vdots \\ Status_{t+n} \end{bmatrix}$$

(n x m)

Weighted vector (m)

SSD Status

FIG. 11

| Log Identifier | O/M | Description |
|---|---|---|
| 00h | | Reserved |
| 01h | M | Error Information |
| 02h | M | SMART / Health Information |
| 03h | M | Firmware Slot Information |
| 04h | O | Changed Namespace List |
| 05h | O | Commands Supported and Effects |
| 06h | O | Device Self-test |
| 07h | O | Telemetry Host-Initiated |
| 08h | O | Telemetry Controller-Initiated |
| 09h - 6Fh | | Reserved |
| 70h | | Discovery (refer to the NVMe over Fabrics Specification) |
| 71h - 7Fh | | Reserved for NVMe over Fabrics |
| 80h - BFh | | I/O Command Set specific |
| C0h - FFh | | Failure Possibility |

O/M : O = Optional, M = Mandatory

FIG. 12

| Time | Score | Status |
|------|-------|--------|
| t+1  | 0.8   | Urgent |
| t+2  | 0.1   | Low    |
| t+3  | 0.5   | High   |
| t+4  | 0.3   | Medium |
| ⋮    | ⋮     | ⋮      |

Non-Urgent: {t+2, t+3, t+4}

FIG. 13

| Time | Component | Status |
|---|---|---|
| t+1 | SSD | Urgent |
| | Component 1 | Urgent |
| | Component 2 | Low |
| | ⋮ | ⋮ |
| Time | Component | Status |
| t+2 | SSD | Low |
| | Component 1 | High |
| | Component 2 | Medium |
| | ⋮ | ⋮ |
| ⋮ | ⋮ | ⋮ |

METHOD FOR OPERATING STORAGE DEVICE AND HOST DEVICE, AND STORAGE DEVICE

CROSS-REFERENCE TO RELATED APPLICATION

This application claims priority from Korean Patent Application No. 10-2020-0170198, filed on Dec. 8, 2020 in the Korean Intellectual Property Office, the disclosure of which is incorporated herein by reference in its entirety.

BACKGROUND

1. Field

Methods, apparatuses and systems consistent with example embodiments relate a host device and a storage device.

2. Description of Related Art

As a storage device continues to operate, a failure may occur in the storage device. Such a failure of the storage device adversely affects reliability of a memory system and therefore is preferably minimized.

Various techniques for recovering from failures that have occurred in a storage device have been proposed. However, because these techniques are applied after a failure actually occurs in the storage device, and the techniques do not help improve the reliability of the memory system. Accordingly, there is a need for a method that may improve the reliability of the memory system.

SUMMARY

One or more example embodiments provide a method for operating a storage device capable of improving reliability of a memory system.

One or more example embodiments provide a method for operating a host device capable of improving the reliability of the memory system.

One or more example embodiments provide a storage device capable of improving the reliability of the memory system.

Example embodiments may address at least the above problems and/or disadvantages and other disadvantages not described above. Also, the example embodiments are not required to overcome the disadvantages described above, and may not overcome any of the problems described above.

According to an aspect of an example embodiment, a method includes providing a storage device which includes a first component and a second component; receiving, via a host interface of the storage device, a command for requesting failure possibility information about the storage device from an external device; and providing, via the host interface, the failure possibility information about the storage device to the external device in response to the command.

According to an aspect of an example embodiment, a method for operating a host device includes: transmitting a command requesting failure possibility information about a storage device to the storage device, wherein the storage device includes a first component and a second component; and receiving the failure possibility information about the storage device from the storage device in response to the command.

According to an aspect of an example embodiment, a storage device includes: a buffer memory configured to temporarily store data provided from a host device; a non-volatile memory configured to store the data provided from the host device; a log monitor configured to collect log data from the buffer memory and the non-volatile memory; and a processor configured to implement a machine learning module that identifies a failure possibility about the storage device based on the log data.

BRIEF DESCRIPTION OF THE DRAWINGS

The above and other aspects will be more from the following description of example embodiments taken in conjunction with the attached drawings, in which:

FIGS. 6 to 10 are diagrams for explaining a machine running operation performed in a storage device according to some example embodiments;

FIGS. 11 and 12 are diagrams for explaining operation of a memory system according to some example embodiments;

FIG. 13 is a diagram for explaining operation of a memory system according to some other example embodiments.

DETAILED DESCRIPTION

Hereinafter, example embodiments will be described with reference to the accompanying drawings.

Figure 1:
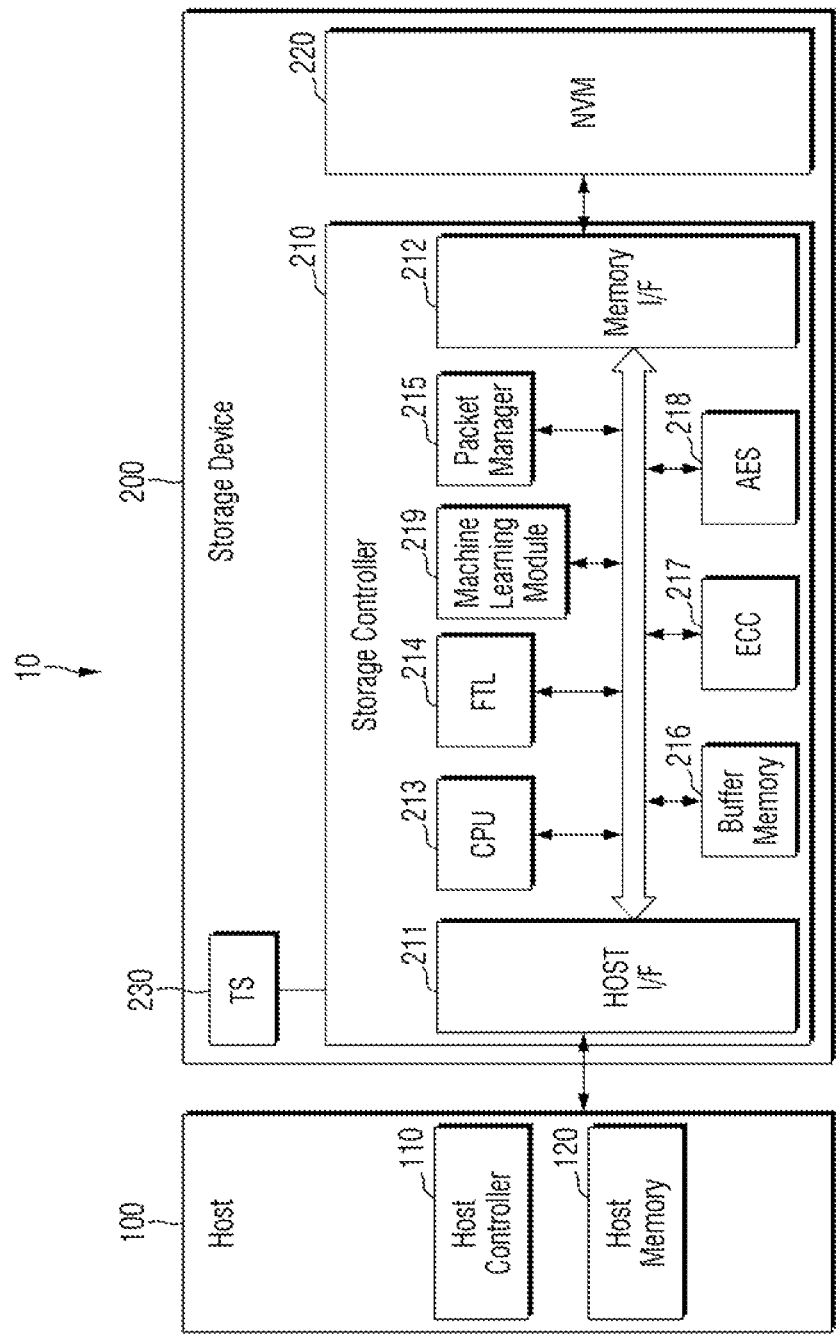
FIG. 1 is a block diagram showing a memory system according to some example embodiments.

FIG. 1 is a block diagram showing a memory system according to some example embodiments.

A memory system 10 may include a host device 100 and a storage device 200. The storage device 200 may also include a storage controller 210 and a non-volatile memory (NVM) 220. Also, in some example embodiments, the host device 100 may include a host controller 110 and a host memory 120. The host memory 120 may function as a buffer memory for temporarily storing data to be transmitted to the storage device 200 or the data received from the storage device 200.

The storage device 200 may be a storage medium for storing data according to a request from the host device 100. For example, the storage device 200 may be at least one of a solid-state drive (SSD), an embedded memory, and a detachable external memory. If the storage device 200 is an SSD, the storage device 200 may be a device that complies with an non-volatile memory express (NVMe).

If the storage device 200 is an embedded memory or an external memory, the storage device 200 may be a device that complies with a universal flash storage (UFS) or an embedded multi-media card (eMMC) standard. The host device 100 and the storage device 200 may each generate and transmit packets complying with the adopted standard protocol.

When the non-volatile memory 220 of the storage device 200 includes a flash memory, the flash memory may include a 2D NAND memory array or a 3D (or vertical) NAND (VNAND) memory array. As another example, the storage device 200 may also include various other types of non-volatile memories. For example, a Magnetic RAM (MRAM), a spin-transfer torque MRAM, a conductive bridging RAM (CBRAM), a Ferroelectric RAM (FeRAM), a Phase RAM (PRAM), a resistive memory (Resistive RAM) and various other types of memories may be applied to the storage device 200.

In some example embodiments, the host controller 110 and the host memory 120 may be implemented as different semiconductor chips. Alternatively, in some example embodiments, the host controller 110 and the host memory 120 may be integrated on the same semiconductor chip. As an example, the host controller 110 may be one of a plurality of modules provided in the application processor, and such an application processor may be implemented as a system on chip (SoC). Further, the host memory 120 may be an embedded memory provided in the application processor, or a non-volatile memory or a memory module placed outside the application processor.

The host controller 110 may manage an operation of storing data of a buffer region (for example, write data) in the non-volatile memory 220 or storing data of the non-volatile memory 220 (for example, read data) in the buffer region.

The storage controller 210 may include a host interface 211, a memory interface 212 and a central processing unit (CPU) 213. Also, the storage controller 210 may further include a flash translation layer (FTL) 214, a packet manager 215, a buffer memory 216, an error correction code (ECC) engine 217, and an advanced encryption standard (AES) engine 218.

The storage controller 210 may further include a working memory into which the flash translation layer (FTL) 214 is loaded, and when the CPU 213 executes the flash translation layer 214, the data write and read operations of the non-volatile memory may be controlled.

The host interface 211 may transmit and receive packets to and from the host device 100. Packets transmitted from the host device 100 to the host interface 211 may include a command, data to be written in the non-volatile memory 220, or the like. The packets transmitted from the host interface 211 to the host device 100 may include a response to a command, data read from the non-volatile memory 220 or the like.

The memory interface 212 may transmit the data to be written in the non-volatile memory 220 to the non-volatile memory 220 or receive the read data from the non-volatile memory 220. The memory interface 212 may be implemented to comply with standard conventions such as Toggle or Open NAND Flash Interface (ONFI).

The flash translation layer 214 may perform various operations such as address mapping, wear-leveling, and garbage collection. The address mapping operation is an operation of changing a logical address received from a host into a physical address which is used for actually storing the data in the non-volatile memory 220. The wear-leveling operation is a technique for ensuring that blocks in the non-volatile memory 220 are used uniformly to prevent an excessive degradation of a particular block, and may be implemented, for example, through a firmware technique of balancing the erasure counts of the physical blocks. The garbage collection operation is a technique for ensuring an available capacity in the non-volatile memory 220 through a method of copying the valid data of the block to a new block and then erasing the existing block.

The packet manager 215 may generate a packet according to the protocol of the interface with the host device 100, or may parse various types of information from the packet received from the host device 100. Further, the buffer memory 216 may temporarily store the data to be recorded in the non-volatile memory 220 or the data read from the non-volatile memory 220. The buffer memory 216 may be provided inside the storage controller 210, but example embodiments are not limited thereto and the buffer memory 216 may be placed outside the storage controller 210.

The ECC engine 217 may perform error detection and correction functions of the data to be recorded in the non-volatile memory 220 or the read data that is read from the non-volatile memory 220. More specifically, the ECC engine 217 may generate parity bits for the write data to be written on the non-volatile memory 220, and the parity bits generated in this way may be stored in the non-volatile memory 220 together with the write data. When reading the data from the non-volatile memory 220, the ECC engine 217 may correct an error of the read data and output the read data with a corrected error, using the parity bits read from the non-volatile memory 220 together with the read data.

The AES engine 218 may perform at least one of encryption and decryption operations of the data which is input to the storage controller 210, using a symmetric-key algorithm.

A machine learning module 219 may perform a machine learning operation on the data generated from the storage device 200.

In some example embodiments, the machine learning module 219 may include an input layer, a hidden layer, and an output layer.

The input layer may be provided with learning data for each time point from the past time point to the present time point. The learning data for each time point may include, for example, log data collected from various components (for example, various types of hardware and firmware including a non-volatile memory 220, a buffer memory 216, and a temperature sensor 230) included in the storage device 200.

Such an input layer may be provided to the hidden layer for learning. In some example embodiments, although a Recurrent Neural Network (RNN) model that may receive time-series features and make sophisticated predictions may be applied as the hidden layer, example embodiments are not limited thereto.

When such learning is completed, prediction information (for example, a failure possibility) at a future time point further than the present time point may be calculated in the output layer. In some example embodiments, although the output layer may use a Multi-Layer Perceptron (MLP), example embodiments are not limited thereto In some example embodiments, the machine learning module 219 may be implemented as firmware or software and operated by the storage device 200. In this case, the machine learning module 219 may control the operation of the storage controller 210. Also, in some example embodiments, the machine learning module 219 may be implemented as hardware and operated by the storage device 200. In this case, the machine learning module 219 may be implemented in the form of another machine learning processor included in the storage device 200.

The temperature sensor 230 may sense temperature of the storage device 200, and provide the sensed temperature information to the storage controller 210. Specifically, the temperature sensor 230 may sense the operating temperature of the storage device 200 and/or the surrounding environment temperature of the storage device 200 and/or the temperature of the components included in the storage device 200, and provide the sensed temperature information to the storage controller 210.

Figure 2:
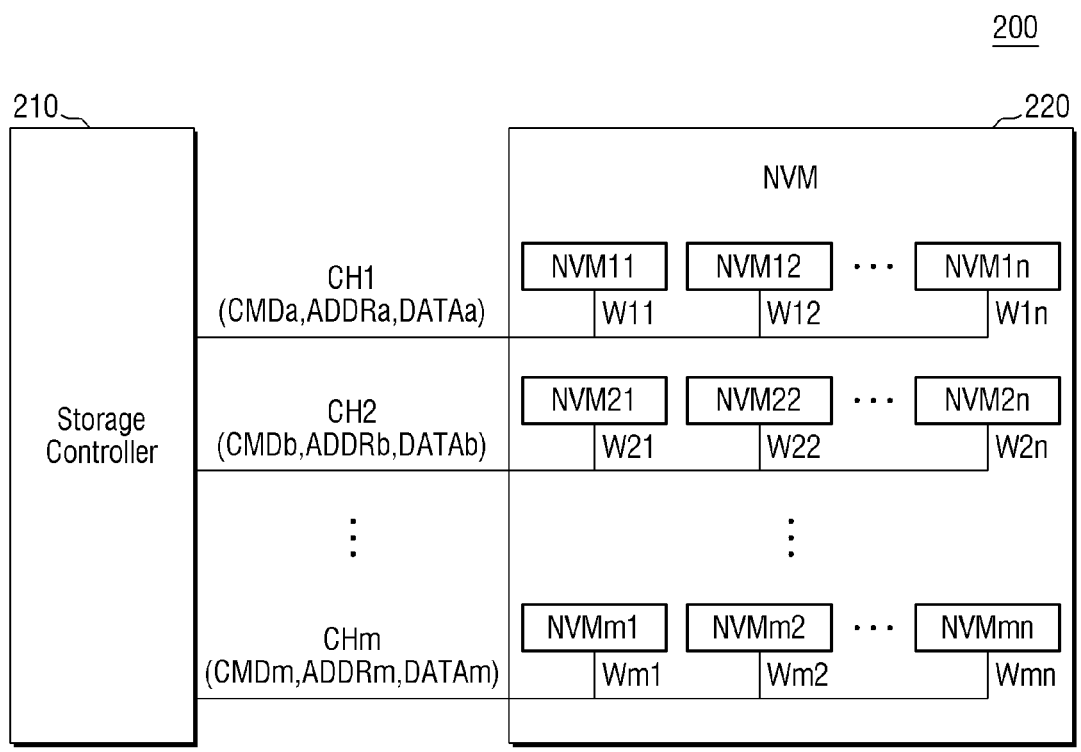
FIG. 2 is a diagram showing a storage controller and a non-volatile memory according to some example embodiments.

FIG. 2 is a diagram in which the storage controller and the non-volatile memory of the storage device of FIG. 1 are reconfigured.

Referring to FIG. 2, the storage device 200 may include a non-volatile storage 220 and a storage controller 210. The storage device 200 may support a plurality of channels CH1 to CHm, and the non-volatile storage 220 and the storage controller 210 may be connected through the plurality of channels CH1 to CHm. For example, the storage device 200 may be implemented as a storage device such as an SSD.

The non-volatile storage 220 may include a plurality of non-volatile memory devices NVM11 to NVMmn. Each of the non-volatile memory devices NVM11 to NVMmn may be connected to one of the plurality of channels CH1 to CHm through a corresponding way. For example, the non-volatile memory devices NVM11 to NVM1n are connected to a first channel CH1 through the ways W11 to W1n, and the non-volatile memory devices NVM21 to NVM2n may be connected to a second channel CH2 through the ways W21 to W2n. In an example embodiment, each of the non-volatile memory devices NVM11 to NVMmn may be implemented in a memory unit that may operate according to individual instructions from the storage controller 210. For example, although each of the non-volatile memory devices NVM11 to NVMmn may be implemented as a chip or a die, example embodiments are not limited thereto.

The storage controller 210 may transmit and receive signals to and from the non-volatile storage 220 through the plurality of channels CH1 to CHm. For example, the storage controller 210 may transmit commands CMDa to CMDM, addresses ADDRa to ADDRm, and data DATAa to DATAm to the non-volatile storage 220 through the channels CH1 to CHm, or may receive the data DATAa to DATAm from the non-volatile storage 220.

The storage controller 210 may select one of the non-volatile memory devices connected to the channel through each channel, and may transmit and receive signals to and from the selected non-volatile memory device. For example, the storage controller 210 may select the non-volatile memory device NVM11 among the non-volatile memory devices NVM11 to NVM1n connected to the first channel CH1. The storage controller 210 may transmit command CMDa, address ADDRa, and data DATAa to the selected non-volatile memory device NVM11 through the first channel CH1 or may receive the data DATAa from the selected non-volatile memory device NVM11.

The storage controller 210 may transmit and receive signals in parallel to and from the non-volatile storage 220 through different channels from each other. For example, the storage controller 210 may transmit a command CMDb to the non-volatile storage 220 through the second channel CH2, while transmitting a command CMDa to the non-volatile storage 220 through the first channel CH1. For example, the storage controller 210 may receive the data DATAb from the non-volatile storage 220 through the second channel CH2, while receiving the data DATAa from the non-volatile storage 220 through the first channel CH1.

The storage controller 210 may control the overall operation of the non-volatile storage 220. The storage controller 210 may transmit the signal to the channels CH1 to CHm to control each of the non-volatile memory devices NVM11 to NVMmn connected to the channels CH1 to CHm. For example, the storage controller 210 may transmit the command CMDa and the address ADDRa to the first channel CH1 to control selected one among the non-volatile memory devices NVM11 to NVM1n.

Each of the non-volatile memory devices NVM11 to NVMmn may operate according to the control of the storage controller 210. For example, the non-volatile memory device NVM11 may program the data DATAa in accordance with the command CMDa, the address ADDRa, and the data DATAa provided to the first channel CH1. For example, the non-volatile memory device NVM21 may read the data DATAb in accordance with the command CMDb and the address ADDRb provided to the second channel CH2, and transmit the read data DATAb to the storage controller 210.

Although FIG. 2 shows that the non-volatile storage 220 communicates with the storage controller 210 through m channels, and the non-volatile storage 220 includes n non-volatile memory devices corresponding to each channel, the number of channels and the number of non-volatile memory devices connected to one channel may be variously changed.

Figure 3:
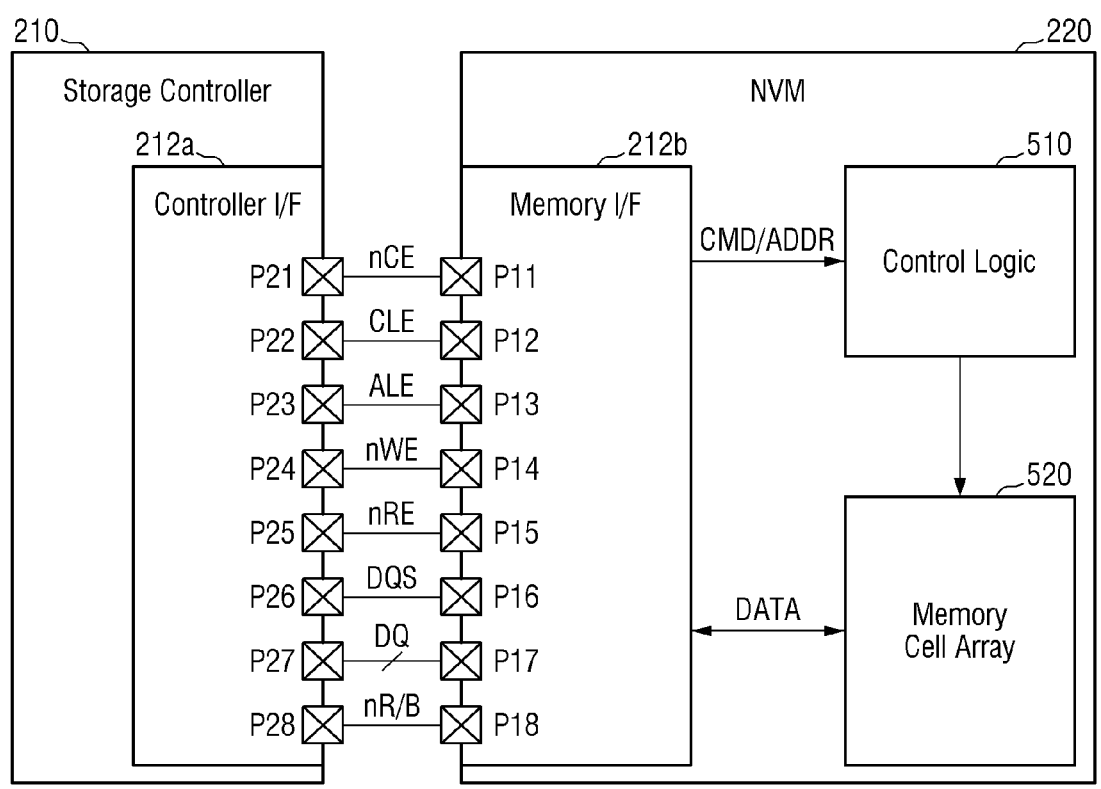
FIG. 3 is a diagram showing a storage controller, a memory interface, and a non-volatile memory according to some example embodiments.

FIG. 3 is a diagram of a storage controller, memory interface and non-volatile memory according to some example embodiments. For example, the storage controller, the memory interface, and the non-volatile memory of FIG. 1 may be reconfigured. The memory interface 212 may include a controller interface circuit 212a.

The non-volatile memory 220 may include first to eight pins P11 to P18, a memory interface circuit 212b, a control logic circuit 510, and a memory cell array 520.

The memory interface circuit 212b may receive a chip enable signal nCE from the storage controller 210 through the first pin P11. The memory interface circuit 212b may transmit and receive signals to and from the storage controller 210 through second to eighth pins P12 to P18 according to the chip enable signal nCE. For example, when the chip enable signal nCE is in an enable status (e.g., a low level), the memory interface circuit 212b may transmit and receive signals to and from the storage controller 210 through second to eighth pins P12 to P18.

The memory interface circuit 212b may receive a command latch enable signal CLE, an address latch enable signal ALE, and a write enable signal nWE from the storage controller 210 through second to fourth pins P12 to P14. The memory interface circuit 212b may receive a data signal DQ from the storage controller 210 or transmit the data signal DQ to the storage controller 210 through a seventh pin P17. The command CMD, the address ADDR, and the data DATA may be transferred through the data signal DQ. For example, the data signal DQ may be transferred through a plurality of data signal lines. In this case, the seventh pin P17 may include a plurality of pins corresponding to the plurality of data signals.

The memory interface circuit 212b may acquire the command CMD from the data signal DQ received in an enable section (e.g., a high level status) of the command latch enable signal CLE on the basis of the toggle timings of the write enable signal nWE. The memory interface circuit 212b may acquire the address ADDR from the data signal DQ received in the enable section (e.g., a high level status) of the address latch enable signal ALE on the basis of the toggle timings of the write enable signal nWE.

In some example embodiments, the write enable signal nWE holds a static status (e.g., a high level or a low level) and then may be toggled between the high level and the low level. For example, the write enable signal nWE may be toggled at the section in which the command CMD or the address ADDR is transmitted. Accordingly, the memory interface circuit 212b may acquire the command CMD or the address ADDR on the basis of the toggle timings of the write enable signal nWE.

The memory interface circuit 212b may receive a read enable signal nRE from the storage controller 210 through the fifth pin P15. The memory interface circuit 212b may receive the data strobe signal DQS from the storage controller 210 through a sixth pin P16, or may transmit the data strobe signal DQS to the storage controller 210.

In the data DATA output operation of the non-volatile memory 220, the memory interface circuit 212b may receive the read enable signal nRE toggled through fifth pin P15 before outputting the data DATA. The memory interface circuit 212b may generate the data strobe signal DQS toggled on the basis of the toggling of the read enable signal nRE. For example, the memory interface circuit 212b may generate the data strobe signal DQS that starts toggle after a predetermined delay (e.g., tDQSRE) on the basis of the toggling start time of the read enable signal nRE. The memory interface circuit 212b may transmit a data signal DQ including the data DATA on the basis of the toggle timing of the data strobe signal DQS. As a result, the data DATA may be arranged at the toggle timing of the data strobe signal DQS and transmitted to the storage controller 210.

In the data DATA input operation of the non-volatile memory 220, when the data signal DQ including the data DATA is received from the storage controller 210, the memory interface circuit 212b may receive the data strobe signal DQS toggled together with the data DATA from the storage controller 210. The memory interface circuit 212b may acquire the data DATA from the data signal DQ on the basis of the toggle timing of the data strobe signal DQS. For example, the memory interface circuit 212b may acquire the data DATA by sampling the data signal DQ at a rising edge and a falling edge of the data strobe signal DQS.

The memory interface circuit 212b may transmit a ready/busy output signal nR/B to the storage controller 210 through an eighth pin P18. The memory interface circuit 212b may transmit status information about the non-volatile memory 220 to the storage controller 210 through the ready/busy output signal nR/B. When the non-volatile memory 220 is in the busy status (that is, when the internal operations of the non-volatile memory 220 are being performed), the memory interface circuit 212b may transmit the ready/busy output signal nR/B indicating the busy status to the storage controller 210. When the non-volatile memory 220 is in the ready status (i.e., the internal operations of the non-volatile memory 220 are not performed or are completed), the memory interface circuit 212b may transmit the ready/busy output signal nR/B indicating the ready status to the storage controller 210.

For example, while the non-volatile memory 220 reads the data DATA from the memory cell array 520 according to a page read command, the memory interface circuit 212b may transmit the ready/busy output signal nR/B indicating the busy status (e.g., a low level) to the storage controller 210. For example, while the non-volatile memory 220 programs the data DATA into the memory cell array 520 according to the program instruction, the memory interface circuit 212b may transmit the ready/busy output signal nR/B indicating the busy status to the storage controller 210.

The control logic circuit 510 may generally control various operations of the non-volatile memory 220. The control logic circuit 510 may receive the command/address CMD/ADDR acquired from the memory interface circuit 212b. The control logic circuit 510 may generate control signals for controlling other components of the non-volatile memory 220 according to the received command/address CMD/ADDR. For example, the control logic circuit 510 may generate various control signals for programing the data DATA in the memory cell array 520 or reading the data DATA from the memory cell array 520

The memory cell array 520 may store the data DATA acquired from the memory interface circuit 212b according to the control of the control logic circuit 510. The memory cell array 520 may output the stored data DATA to the memory interface circuit 212b according to the control of the control logic circuit 510.

The memory cell array 520 may include a plurality of memory cells. For example, a plurality of memory cells may be flash memory cells. However, example embodiments are not limited thereto, and the memory cells may be a Resistive Random Access Memory (RRAM) cell, a Ferroelectric Random Access Memory (FRAM) cell, a Phase Change Random Access Memory (PRAM) cell, a Thyristor Random Access Memory (TRAM) cell, and a Magnetic Random Access Memory (MRAM) cell. Hereinafter, example embodiments of the present disclosure will be described with a focus on an example embodiment in which the memory cells are NAND flash memory cells.

The storage controller 210 may include first to eighth pins P21 to P28, and a controller interface circuit 212a. The first to eighth pins P21 to P28 may correspond to the first to eighth pins P11 to P18 of the non-volatile memory 220.

The controller interface circuit 212a may transmit a chip enable signal nCE to the non-volatile memory 220 through a first pin P21. The controller interface circuit 212a may transmit and receive signals to and from the non-volatile memory 220 selected through the chip enable signal nCE through the second to eighth pins P22 to P28.

The controller interface circuit 212a may transmit the command latch enable signal CLE, the address latch enable signal ALE, and the write enable signal nWE to the non-volatile memory 220 through the second to fourth pins P22 to P24. The controller interface circuit 212a may transmit the data signal DQ to the non-volatile memory 220 or receive the data signal DQ from the non-volatile memory 220 through a seventh pin P27.

The controller interface circuit 212a may transmit the data signal DQ including the command CMD or the address ADDR to the non-volatile memory 220 along with a toggled enable signal nWE. The controller interface circuit 212a may transmit the data signal DQ including the command CMD to the non-volatile memory 220 by transmitting the command latch enable signal CLE having the enable status, and may transmit the data signal DQ including the address ADDR to the non-volatile memory 220 by transmitting the address latch enable signal ALE having the enable status.

The controller interface circuit 212a may transmit the read enable signal nRE to the non-volatile memory 220 through the fifth pin P25. The controller interface circuit 212a may receive the data strobe signal DQS from the non-volatile memory 220 through the sixth pin P26, or may transmit the data strobe signal DQS to the non-volatile memory 220.

In the data DATA output operation of the non-volatile memory 220, the controller interface circuit 212a may generate a toggling read enable signal nRE and transmit the read enable signal nRE to the non-volatile memory 220. For example, the controller interface circuit 212a may generate the read enable signal nRE that changes from the static status (e.g., a high level or a low level) to the toggle status before the data DATA is output. As a result, the data strobe signal DQS toggled on the basis of the read enable signal nRE may be generated in the non-volatile memory 220. The controller interface circuit 212a may receive the data signal DQ including the data DATA along with the toggled data strobe signal DQS from the non-volatile memory 220. The controller interface circuit 212a may acquire the data DATA from the data signal DQ on the basis of the toggle timing of the data strobe signal DQS.

In the data DATA input operation of the non-volatile memory 220, the controller interface circuit 212a may generate a toggled data strobe signal DQS. For example, the controller interface circuit 212a may generate a data strobe signal DQS that changes from the static status (e.g., a high level or a low level) to the toggle status before transmitting the data DATA. The controller interface circuit 212a may transmit the data signal DQ including the data DATA to the non-volatile memory 220 on the basis of the toggle timings of the data strobe signal DQS.

The controller interface circuit 212a may receive a ready/busy output signal nR/B from the non-volatile memory 220 through the eighth pin P28. The controller interface circuit 212a may identify the status information about the non-volatile memory 220 on the basis of the ready/busy output signal nR/B.

Hereinafter, the operation of the memory system according to some example embodiments will be described referring to FIGS. 4 to 12.

Figure 4:
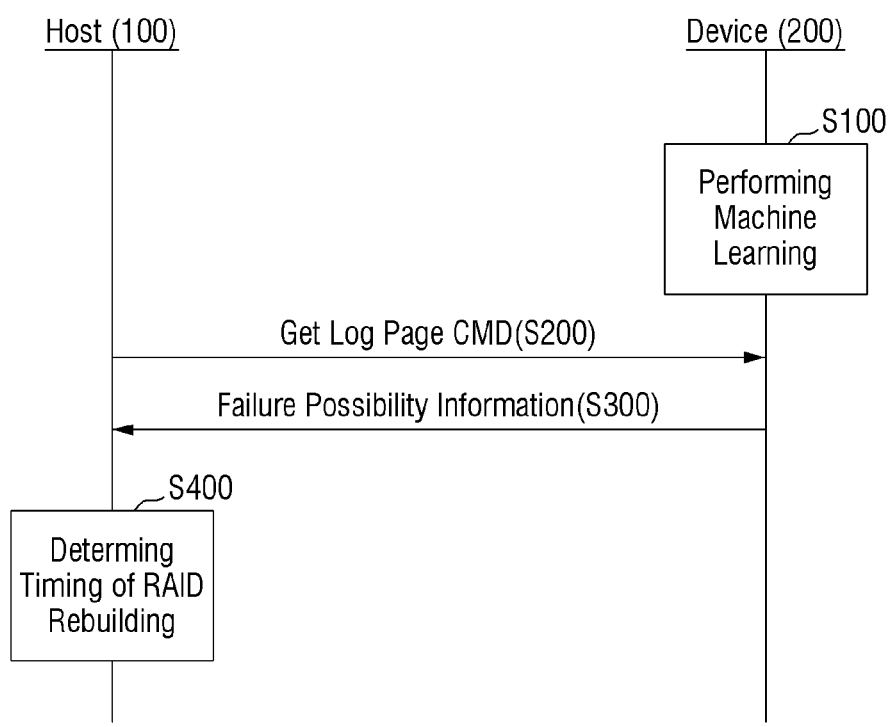
FIG. 4 is a flowchart showing operation of a memory system according to some example embodiments.
Figure 5:
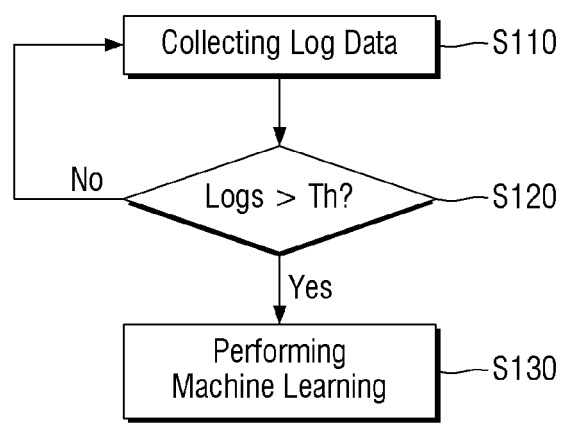
FIG. 5 is a flowchart for explaining a machine running operation performed in a storage device according to some example embodiments.

FIG. 4 is a flowchart showing operation of a memory system according to some example embodiments. FIG. 5 is a flowchart for explaining a machine running operation performed in a storage device according to some example embodiments. FIGS. 6 to 10 are diagrams for explaining a machine running operation performed in a storage device according to some example embodiments. FIGS. 11 and 12 are diagrams for explaining the operation of the memory system according to some example embodiments.

First, referring to FIG. 4, a machine running operation is performed on the storage device 200 (S100).

Although FIG. 4 shows a sequence in which the machine learning operation (S100) is performed on the storage device 200, and then, the command for requesting the failure possibility information about the storage device 200 is received from the host device 100 (S200), example embodiments are not limited to the shown operation sequence.

A time point of execution of the machine learning operation (S100) performed by the storage device 200 may be performed with various modifications, unlike the shown example. Also, in some example embodiments, the storage device 200 may perform the machine learning operation (S100) according to reception of a command for instructing the execution of the machine running operation from the host device 100.

The machine learning operation performed in the storage device 200 may include, for example, log data collection operations (S110, S120) shown in FIG. 5, and a machine learning performing operation (S130) using the log data.

Hereinafter, a more specific description will be given referring to FIGS. 5-10.

Referring to FIG. 5, log data is collected (S110).

Figure 6:
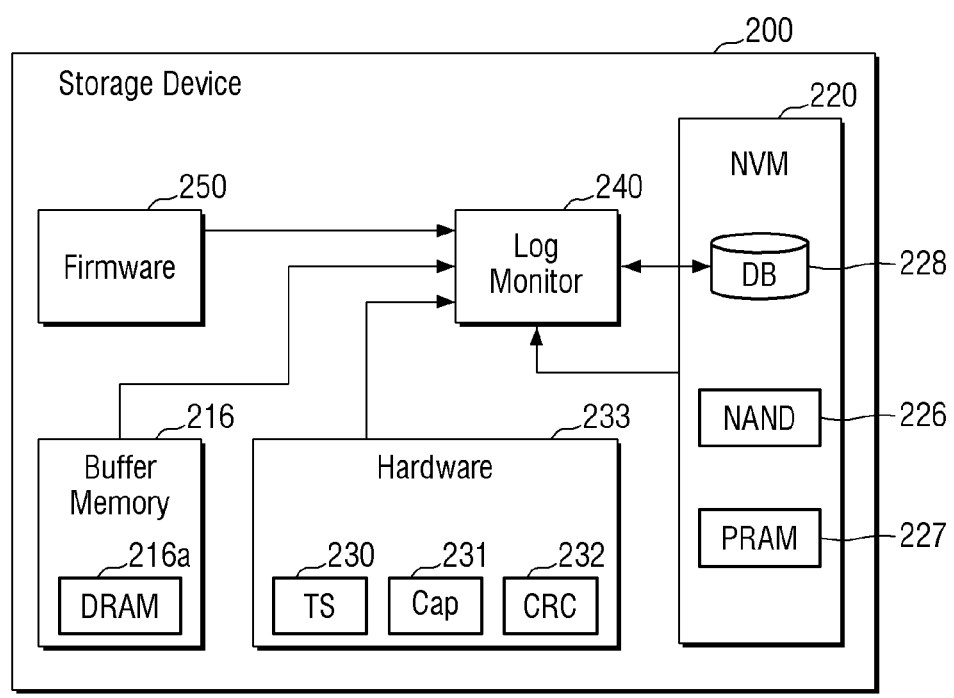

Referring to FIG. 6, a log monitor 240 of the storage device 200 is included in the storage device 200 and may collect the log data from various components 216, 220, 233, and 250 constituting the storage device 200.

FIG. 6 shows a buffer memory 216 including a DRAM 216a, a non-volatile memory 220 including a NAND 226 and a PRAM 227, various hardware 233 forming the storage device 200 such as a temperature sensor 230, a capacitor 231 and a Cyclic Redundancy Code (CRC) module 232, and a firmware 250 installed in the storage device 200, as examples of the components included in the storage device 200. However, example embodiments are not limited thereto.

In some example embodiments, the log monitor 240 may be implemented as a part of the machine learning module (219 of FIG. 1). Also, in some other example embodiments, the log monitor 240 may be implemented as a separate module different from the machine learning module (219 of FIG. 1).

In some example embodiments, the log monitor 240 may be implemented as software and operate on the storage device 200, and the log monitor 240 may be implemented as hardware and operate on the storage device 200.

The log monitor 240 may collect the log data from the operations of the buffer memory 216, the non-volatile memory 220, the hardware 233 and the firmware 250 included in the storage device 200. Specifically, the log monitor 240 may collect the log data for predicting the failure possibility of the buffer memory 216, the non-volatile memory 220, the hardware 233 and the firmware 250 from the operations of the buffer memory 216, the non-volatile memory 220, the hardware 233 and the firmware 250 included in the storage device 200.

An example of the log data is shown in FIG. 7.

Referring to FIGS. 6 and 7, the log monitor 240 may collect the log data for predicting the failure possibility of the NAND 226 from the operation of the NAND 226.

The log data for predicting the failure possibility of the NAND 226 may include a reclaim count of the NAND 226, a read latency histogram of the NAND 226, a read retry count of the NAND 226, the number of Run Time Bad Block (RTBB) per die of the NAND 226, the number of available die of the NAND 226, a Uncorrectable Error CorreCtion (UECC) count of the NAND 226 and the like.

The reclaim operation of the NAND 226 is an operation which successfully reads the data stored in the NAND 226 through the read retry operation, but finds many error bits included in the read data, and shifts the data stored in the read page to the new page of the NAND 226.

A high occurrence count of the reclaim operation of the NAND 226 indicates the failure possibility of the NAND 226 rises, the log monitor 240 collects the reclaim count of the NAND 226 as log data for predicting the failure possibility of the NAND 226.

An increase in the read latency of the NAND 226 may indicate that the read retry or the reclaim operation is performed in the NAND 226, and the read latency increases. Thus, the increase in the read latency of the NAND 226 may indicate that the failure possibility of the NAND 226 rises. Accordingly, the log monitor 240 collects the Read Latency Histogram of the NAND 226 as log data for predicting the failure possibility of the NAND 226.

The read retry operation of the NAND 226 is an operation in which an error occurs in the read process and the read operation is performed again to read the same data.

Because the high occurrence count of the read retry operation of the NAND 226 indicates that the failure possibility of the NAND 226 rises, the log monitor 240 collects the read retry count of the NAND 226 as log data for predicting the failure possibility of the NAND 226.

The Run Time Bad Block (RTBB) of the NAND 226 indicates a block in which a failure occurs during operation of the NAND 226.

An increase in the RTBB of the NAND 226 indicates that the failure possibility of the NAND 226 rises. Therefore, the log monitor 240 collects the number of RTBB per die of the NAND 226 as log data for predicting the failure possibility of the NAND 226.

The number of available dies of the NAND 226 indicates the number of the NAND chips actually used in NAND 226, and the number of available dies of the NAND 226 decreases as the number of defective NAND chips increases.

Because the decrease in the number of available dies of the NAND 226 indicates that the failure possibility of the NAND 226 rises, the log monitor 240 collects the number of available dies of the NAND 226 as log data for predicting the failure possibility of the NAND 226.

The UECC count of the NAND 226 indicates the occurrence count of uncorrectable error that occurs in NAND 226.

Because an increase in the UECC count of the NAND 226 indicates that the failure possibility of the NAND 226 rises, the log monitor 240 collects the UECC count of the NAND 226 as log data for predicting the failure possibility of the NAND 226.

In addition, the log monitor 240 may collect log data for predicting the failure possibility of the DRAM 216*a* from the operation of the DRAM 216*a*.

The log data for predicting the failure possibility of the DRAM 216*a* may include a Correctable Error CorreCtion (CECC) count of the DRAM 216*a*, the temperature history of the DRAM 216*a*, and the like.

The CECC count of the DRAM 216*a* is a count of occurrence of 1-bit flip during operation of the DRAM 216*a*.

Because an increase in the CECC count of DRAM 216*a* indicates that the failure possibility of the DRAM 216*a* increases, the log monitor 240 collects the CECC count of the DRAM 216*a* as log data for predicting the failure possibility of the DRAM 216*a*.

The temperature history of the DRAM 216*a* is data indicating the operating temperature at which the DRAM 216*a* operates over time.

Because the operating temperature of the DRAM 216*a* may affect the failure possibility of the DRAM 216*a*, the log monitor 240 collects the temperature history of the DRAM 216*a* as log data for predicting the failure possibility of the DRAM 216*a*.

Further, the log monitor 240 may collect log data for predicting the failure possibility of the capacitor 231 from the operation of the capacitor 231.

The log data for predicting the failure possibility of the capacitor 231 may include the status (Capacitor Health) of the capacitor 231 or the like.

The status (Capacitor Health) of the capacitor 231 is information which indicates the status of the capacitor 231 by numerically expressing the charging status of the capacitor 231 existing in the storage device 200. For example, if the initial value of the capacitor 231 is 100 (i.e., when the capacitor 231 is new), the charging capacity decreases as the capacitor 231 is used. Thus, the value of the status (Capacitor Health) of the capacitor 231 gradually decreases.

Because the status (Capacitor Health) of the capacitor 231 may affect the failure possibility of the capacitor 231, the log monitor 240 collects the status (Capacitor Health) of the capacitor 231 as log data for predicting the failure possibility of the capacitor 231.

Further, the log monitor 240 may collect log data for predicting the failure possibility of the temperature sensor 230 from the operation of the temperature sensor 230.

The log data for predicting the failure possibility of the temperature sensor 230 may include the retry count of the temperature sensor 230 or the like.

The retry count of the temperature sensor 230 indicates a count of retry attempts that occur when reading the value sensed from the temperature sensor 230.

Because an increase in the retry count of the temperature sensor 230 indicates that the failure possibility of the temperature sensor 230 rises, the log monitor 240 collects the retry count of the temperature sensor 230 as log data for predicting the failure possibility of the temperature sensor 230.

Further, the log monitor 240 may collect log data for predicting the failure possibility of the CRC module 232, from the operation of the CRC module 232.

The log data for predicting the failure possibility of the CRC module 232 may include the error history of the CRC module 232 or the like.

The error history of the CRC module 232 may indicate the signal integrity status of the internal data path of the storage device 200.

Because a high CRC error count indicates that the operation count of the CRC module 232 increases and the signal integrity status of the internal data path of the storage device 200 is not good, the log monitor 240 collects the error history of the CRC module 232 as log data for predicting the failure possibility of the CRC module 232 or the storage device 200.

Further, the log monitor 240 may collect log data for predicting the failure possibility of the firmware 250, from the operation of the firmware 250.

The log data for predicting the failure possibility of the firmware 250 may include an exception count and a reset count that occur in the firmware 250 or the like.

An increase in the exception count and the reset count of the firmware 250 may indicate that the firmware 250 needs to be changed due to frequent occurrence of bug or the control operation of the storage device 200 not being performed smoothly. Therefore, the log monitor 240 collects the exception count and the reset count of the firmware 250 as log data for predicting the failure possibility of the firmware 250 or the storage device 200.

Referring to FIG. 5 again, a determination with respect to whether the number of collected log data is larger than the predetermined number is made (S120). If the number of collected log data is smaller than the predetermined number (S120—N), the collection of log data continues (S110).

In some example embodiments, the log data collection operation (S110) may be continued until the number of log data satisfying a time window to be described later is collected.

Referring to FIG. 6, in some example embodiments, the log monitor 240 may store the collected log data in the non-volatile memory 220 in the form of a DB 228. That is, any one of the plurality of the NAND chips included in the non-volatile memory 220 may store the log data collected by the log monitor 240.

However, example embodiments are not limited thereto, and the log monitor 240 may also store the collected log data in a region other than the non-volatile memory 220. For example, the log monitor 240 may also store the collected log data in another storage region connected to the storage device 200 through a network.

Figure 8:
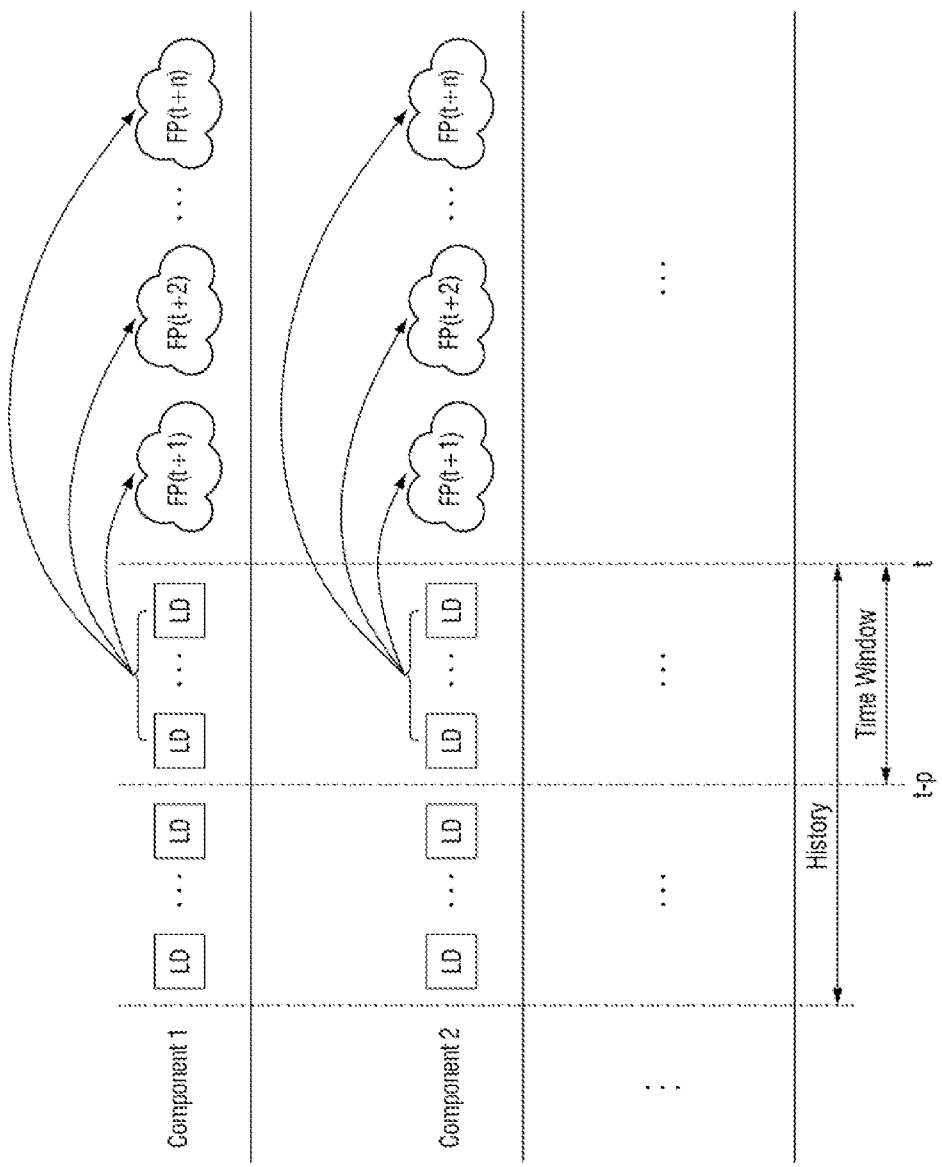

Referring to FIGS. 6 and 8, for example, the number of log data required for the log monitor 240 to collect log data from the operation of the NAND 226 in units of 10 seconds and predict the failure possibility of the NAND 226 may be 5 (i.e., p=5 of FIG. 8). In this case, the log monitor 240 may collect the above-mentioned log data from the operation of the NAND 226 for at least 50 seconds. That is, the failure possibility prediction operation of the NAND 226 of the machine learning module 219 may be performed after at least 50 seconds has elapsed.

Referring to FIG. 5 again, when the number of collected log data is larger than the predetermined number (S120—Y), the machine learning operation is performed (S130).

Referring to FIGS. 1 and 8, each component may include k (k is a natural number) log data that has been accumulated up to a current time point, and the machine learning module 219 may predict the failure possibility of each component, using p (p is a natural number smaller than k) log data included within a predetermined time window among the k log data for each component collected according to passage of time. As time passes, the amount of k log data may increase.

As shown in FIG. 8, when the present time point is assumed to be t, the machine learning module 219 may predict failure possibility (FP(t+1), FP(t+2), and FP(t+n)) up to a future n (n is a natural number) time point of a first component (component 1), using the p log data included in the time window, among k log data collected from the past to the present time point from the operation of the first component (component 1).

Further, the machine learning module 219 may predict the failure possibility (FP(t+1), FP(t+2), and FP(t+n)) up to the future n time point of a second component (component 2), using p log data included in the time window, among the k log data collected from the past to the present time point from the operation of the second component (component 2).

Such an operation of the machine learning module 219 may be performed on m (m is a natural number) components included in the storage device 200.

Figure 9:
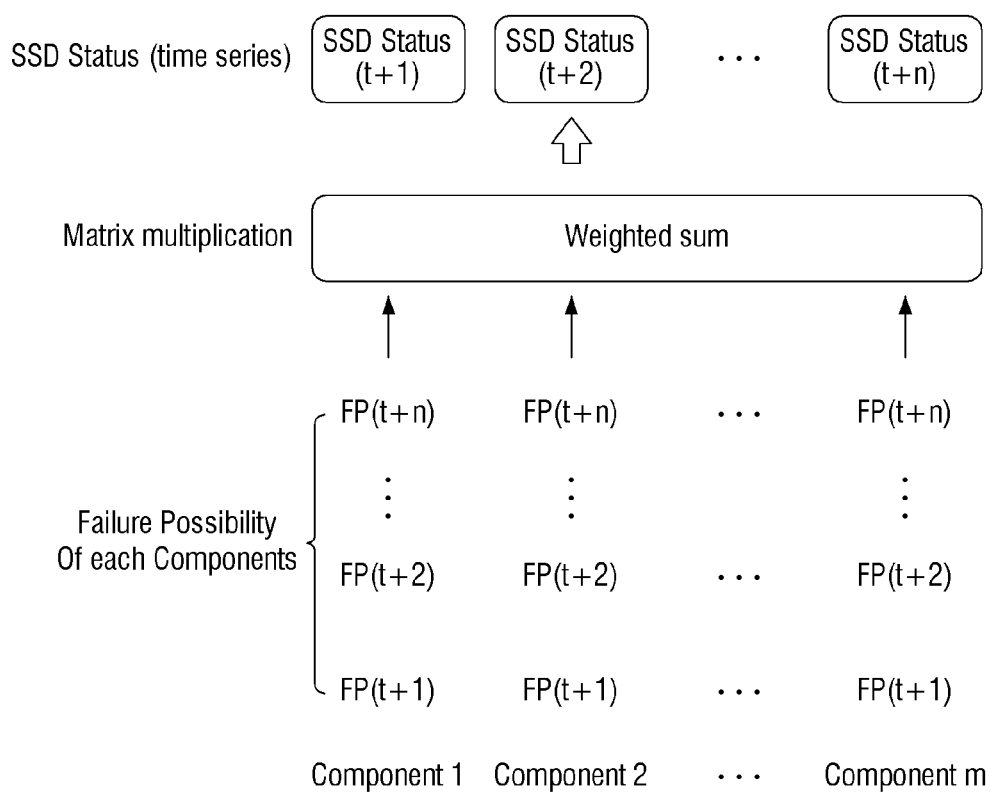

Next, referring to FIGS. 1 and 9, the machine learning module 219 may predict failure possibility of the storage device 200 (SSD Status(t+1), SSD Status(t+2), and SSD Status(t+n)) at different time points up to the future n time point of the storage device 200 on the basis of the failure possibility (FP(t+1), FP(t+2), and FP(t+n)) for each component predicted up to the future n time point.

For example, referring to FIG. 10, the machine learning module 219 may form a matrix on the basis of the failure possibility (FP(t+1), FP(t+2), and FP(t+n)) for each component predicted for different time points up to the future n time point, and multiply the formed matrix by a weighted vector for each component to predict the failure possibility of the storage device 200 (SSD Status(t+1), SSD Status(t+2), and SSD Status(t+n)) for different time points up to the future n time point.

Here, the weighted vector for each component may be determined by various methods. In some example embodiments, a past failure rate for each component may be considered as the weighted vector for each component. However, example embodiments are not limited thereto.

Referencing FIG. 4 again, the host device 100 transmits a command for requesting the failure possibility information about the storage device 200 to the storage device 200 (S200).

In some example embodiments, the command for requesting the failure possibility information about the storage device 200 may include a Get Log Page command.

For example, a log identifier of the Get Log Page command may be any one of C0 to FF (wherein C0 and FF are base 16) as shown in FIG. 11. That is, when the host device 100 specifies the log identifier as one of C0 to FF and transmits the Get Log Page command to the storage device 200, the host device 100 may request the failure possibility information about the storage device 200 from the storage device 200.

Referring to FIG. 4, the storage device 200 that has received the Get Log Page command responds to the host device 100 with the failure possibility information about the storage device 200 (S300).

In some example embodiments, the response of the storage device 200 may include status information for multiple prediction time points, as shown in FIG. 12.

Specifically, referring to FIG. 12, the storage device 200 may respond to the host device 100 with a score obtained by scoring the failure possibility of the storage device 200 and status information (Status) obtained by expressing the failure possibility of the storage device 200 as a status, at each prediction time point.

In some example embodiments, the status information (Status) may include an urgent status that requires immediate measure, a low status which is a non-urgent status and has relatively low failure possibility, a medium status which is a non-urgent status and has failure possibility higher than the low status, and a high status which is a non-urgent status and has failure possibility higher than the medium status and lower than the urgent status. However, example embodiments are not limited thereto, and the status information may be classified and expressed in various different ways as needed.

In some other example embodiments, in addition to the Get Log Page command discussed above, the command in which the host device 100 requests the failure possibility information about the storage device 200 may include a command of an admin command set, such as Get Feature command included in the NVMe standard.

In this case, when the host device 100 requests data of specific feature ID of the storage device 200 through the Get Feature command, the storage device 200 may define failure possibility information in the feature identifier (FID), and provide the host device 100 with the failure possibility information based on the specific feature ID.

Further, in some other example embodiments, the command in which the host device 100 requests the failure possibility information about the storage device 200 may include the Security Send command included in the NVMe standard.

In this case, when the host device 100 requests the failure possibility information from the storage device 200 through the Security Send command, the storage device 200 encrypts the failure possibility information with the security protocol, and may provide the failure possibility information to the host device 100 based on the Security Receive command.

Referring to FIG. 4, the host device 100 determines RAID rebuilding timing of the storage device 200 on the basis of failure possibility information received from the storage device 200 (S400).

For example, when the failure possibility of the storage device 200 at the near future time point corresponds to the urgent status, the host device 100 may immediately perform the RAID rebuilding of the storage device 200. When the failure possibility of the storage device 200 at the near future time point corresponds to the low status, the host device 100 may perform the RAID rebuilding at a later time, after sufficiently performing the I/O operation with the storage device 200.

In this way, the predicted failure possibility information about the storage device is provided to the host device, and the host device may take necessary measures in advance before the failure actually occurs in the storage device. Accordingly, the reliability of the memory system can be improved.

Hereinafter, the operation of the memory system according to some other example embodiments will be described referring to FIG. 13.

FIG. 13 is a diagram for explaining the operation of the memory system according to some other example embodiments. Hereinafter, repeated explanation of the aforementioned example embodiments will not be provided, and only the differences will be explained.

Referring to FIG. 13, in this example embodiment, the storage device 200 may respond to the host device 100 with the failure possibility information for each component included in the storage device 200 as well as the failure possibility information about the storage device 200.

Specifically, referring to FIG. 13, the storage device 200 may respond to the host device 100 with the status information (Status) expressing the failure possibility of the storage device 200 (i.e., SSD), and status information (Status) expressing the failure possibility of each component included in the storage device 200 (i.e., Component 1 and Component 2), at each prediction time point (i.e., t+1, t+2, ... t+n).

At this time, although the status information (Status) may use the same classification method as that of example embodiments described above, example embodiments are not limited thereto.

In the case of this example embodiment, because the host device 100 may receive failure possibility information for the storage device 200 as a whole and each component in the storage device 200, the storage device 200 can be managed more precisely.

Figure 14:
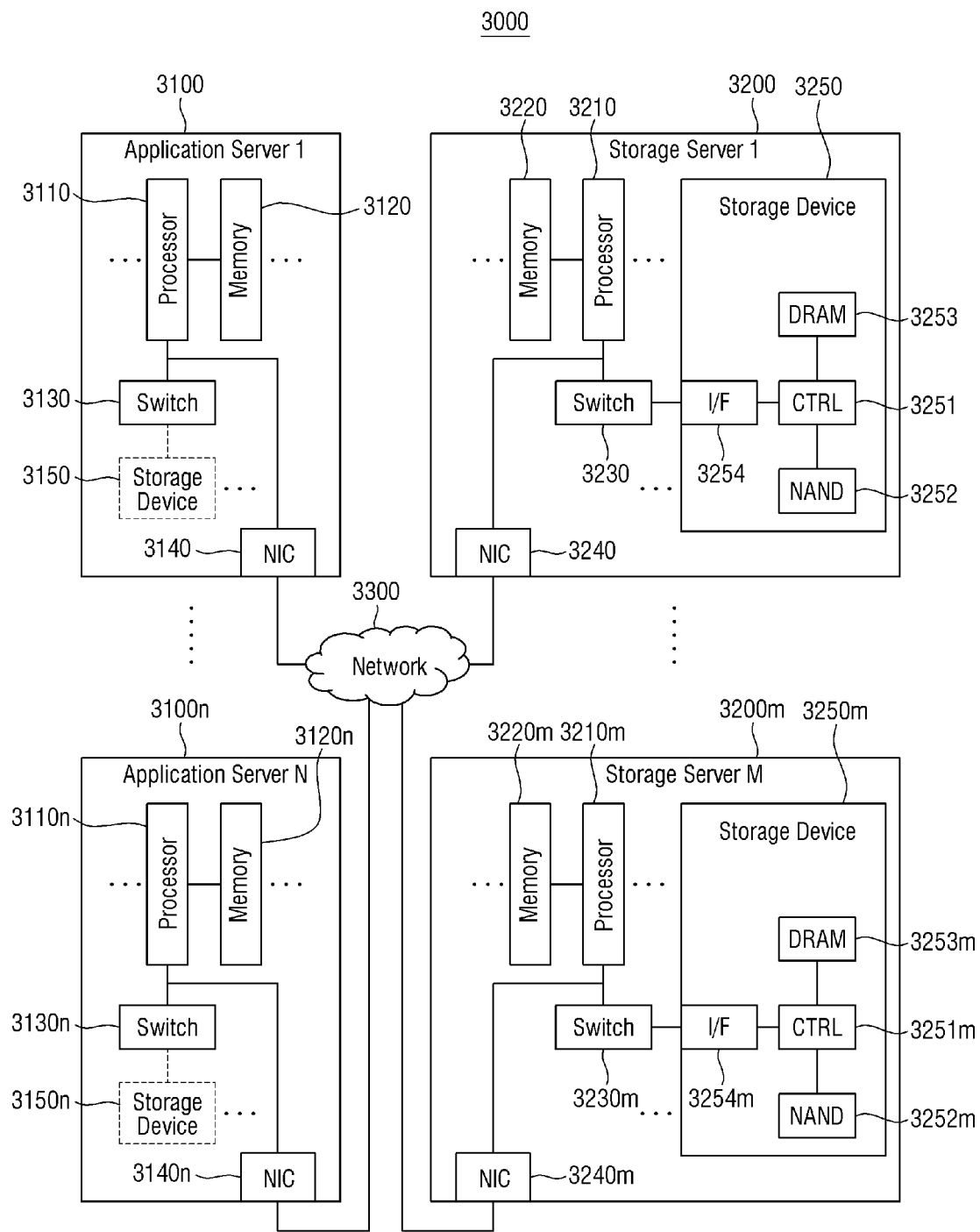
FIG. 14 is a diagram showing a data center including a storage device according to some example embodiments.

FIG. 14 is a diagram showing a data center to which the storage device according to some example embodiments is applied.

Referring to FIG. 14, a data center 3000 is a facility that gathers various types of data and provides services, and may be called a data storage center. The data center 3000 may be a system for providing search engines and database operations, and may be a computing system used by businesses such as banks and government agencies. The data center 3000 may include application servers 3100 to 3100$n$ and storage servers 3200 to 3200$m$. The number of application servers 3100 to 3100$n$ and the number of storage servers 3200 to 3200$m$ may be variously selected, and the number of application servers 3100 to 3100$n$ and the number of storage servers 3200 to 3200$m$ may be different from each other.

The application server 3100 or the storage server 3200 may include at least one of the processors 3110 and 3210 and the memories 3120 and 3220. Taking the storage server 3200 as an example, the processor 3210 may control the overall operation of the storage server 3200, access the memory 3220, and execute commands and/or data loaded into the memory 3220. The memory 3220 may be a Double Data Rate Synchronous DRAM) DDR SDRAM), a High Bandwidth Memory (HBM), a Hybrid Memory Cube (HMC), a Dual In-line Memory Module (DIMM), an Optane DIMM or a Non-Volatile DIMM (NVM DIMM). According to an example embodiment, the number of processors 3210 and the number of memories 3220 included in the storage server 3200 may be variously selected.

In an example embodiment, the processor 3210 and the memory 3220 may constitute a processor-memory pair. In an example embodiment, the number of processors 3210 and the number of memories 3220 may be different from each other. The processor 3210 may include a single core processor or a multi-core processor. The aforementioned explanation of the storage server 3200 may be similarly applied to the application server 3100. According to example embodiments, the application server 3100 may not include a storage device 3150. The storage server 3200 may include at least one or more storage devices 3250. The number of storage devices 3250 included in the storage server 3200 may be variously selected depending on example embodiments.

The application servers 3100 to 3100$n$ and the storage servers 3200 to 3200$m$ may communicate with each other through a network 3300. The network 3300 may be implemented, using Fibre Channel (FC), Ethernet, or the like. At this time, FC is a medium used for a relatively high-speed data transfer, and an optical switch that provides high performance/high availability may be used. The storage servers 3200 to 3200$m$ may be provided as a file storage, a block storage or an object storage, depending on an access way of the network 3300.

In an example embodiment, the network 3300 may be a storage-only network such as a Storage Area Network (SAN). For example, the SAN may be an FC-SAN which uses an FC network and is implemented according to FC Protocol (FCP). In another example, the SAN may be an IP-SAN which uses a TCP/IP network and is implemented according to a SCSI over TCP/IP or Internet SCSI (iSCSI) protocol. In another example embodiment, the network 1300 may be a general network such as a TCP/IP network. For example, the network 1300 may be implemented according to protocols such as an FC over Ethernet (FCoE), a Network Attached Storage (NAS), and a NVMe over Fabrics (NVMe-oF).

Hereinafter, the application server 3100 and the storage server 3200 will be mainly described. The description of the application server 3100 may also be applied to another application server 3100$n$, and the description of the storage server 3200 may also be applied to another storage server 3200$m$.

The application server 3100 may store data requested by the user or client to store in one of the storage servers 3200 to 3200$m$ through the network 3300. Further, the application server 3100 may acquire the data requested by the user or the client to read from one of the storage servers 3200 to 3200$m$ through the network 3300. For example, the application server 3100 may be implemented by a Web server or a Database Management System (DBMS).

The application server 3100 may access the memory 3120$n$ or the storage device 3150$n$ included in another application server 3100$n$ through the network 3300, or may access the memories 3220 to 3220$m$ or the storage devices 3250 to 3250$m$ included in the storage servers 3200 to 3200$m$ through the network 3300. As a result, the application server 3100 may perform various operations on the data stored in the application servers 3100 to 3100$n$ and/or the storage servers 3200 to 3200$m$. For example, the application server 3100 may execute commands for moving or copying the data between the application servers 3100 to 3100$n$ and/or the storage servers 3200 to 3200$m$. At this time, the data may be moved from the storage devices 3250 to 3250$m$ of the storage servers 3200 to 3200$m$ via the memories 3220 to 3220$m$ of the storage servers 3200 to 3200$m$ or directly to the memories 3120 to 3120$n$ of the application servers 3100 to 3100$n$. Data moving through the network 3300 may be data encrypted for security and privacy.

Taking the storage server 3200 as an example, an interface 3254 may provide a physical connection between the processor 3210 and a controller 3251, and a physical connection between the NIC 3240 and the controller 3251. For example, the interface 3254 may be implemented by a Direct Attached Storage (DAS) way in which the storage device 3250 is directly connected with a dedicated cable. For example, the interface 3254 may be implemented by various interface ways, such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCI express (PCIe), a NVM express (NVMe), an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and a compact flash (CF) card interface.

The storage server 3200 may further include a switch 3230 and a NIC 3240. The switch 3230 may selectively connect the processor 3210 and the storage device 3250 or may selectively connect the NIC 3240 and the storage device 3250, according to the control of the processor 3210.

In an example embodiment, the NIC 3240 may include a network interface card, a network adapter, and the like. The NIC 3240 may be connected to the network 3300 by a wired interface, a wireless interface (i.e., a Bluetooth interface), an optical interface, or the like. The NIC 3240 may include an internal memory, a DSP, a host bus interface, or the like, and may be connected to the processor 3210, and/or the switch 3230, or the like through the host bus interface. The host bus interface may also be implemented as one of the examples of the interface 3254 described above. In an example embodiment, the NIC 3240 may also be integrated with at least one of the processor 3210, the switch 3230, and the storage device 3250.

In the storage servers 3200 to 3200m or the application servers 3100 to 3100n, the processor transmits the commands to the storage devices 3130 to 3130n and 3250 to 3250m or the memories 3120 to 3120n and 3220 to 3220m to program or read the data. At this time, the data may be data in which an error is corrected through an ECC engine. The data is data subjected to data bus inversion (DBI) or data masking (DM) process, and may include CRC information. The data may be data that is encrypted for security and privacy.

The storage devices 3150 to 3150m and 3250 to 3250m may transmit the control signal and command/address signal to the NAND flash memory devices 3252 to 3252m according to the read command received from the processor. As a result, when data is read from the NAND flash memory devices 3252 to 3252m, the Read Enable (RE) signal is input as a data output control signal, and may serve to output the data to the DQ bus. Data Strobe (DQS) may be generated using the RE signal. Command and address signals may be latched to the page buffer, depending on a rising edge or a falling edge of a Write Enable (WE) signal.

The controller 3251 may generally control the operation of the storage device 3250. In an example embodiment, the controller 3251 may include a Static Random Access Memory (SRAM). The controller 3251 may write data in the NAND flash 3252 according to a write command, or may read the data from the NAND flash 3252 according to a read command. For example, the write command and/or the read command may be provided from the processor 3210 in the storage server 3200, the processor 3210m in another storage server 3200m, or the processors 3110 and 3110n in the application servers 3100 and 3100n. A DRAM 3253 may temporarily store (buffer) the data to be written in the NAND flash 3252 or the data read from the NAND flash 3252. Also, the DRAM 3253 may store metadata. Here, the metadata is data generated by the controller 3251 to manage the user data or the NAND flash 3252. The storage device 3250 may include an Secure Element (SE) for security or privacy.

In some example embodiments, the storage devices 3150 and 3250 may perform the aforementioned operations. That is, the storage devices 3150 and 3250 collect log data for each component included in the storage devices 3150 and 3250, and may predict the failure possibility for each component on the basis of the collected log data.

The log data collected by each of the storage devices 3150 and 3250 may be stored inside each of the storage devices 3150 and 3250, and the log data may be stored in a single dedicated storage device connected through the network 3300.

At least one of the controllers, interfaces, modules, managers, engines, control logics, monitors, processors, switches, or other element represented by a block as illustrated in FIGS. 1-3, 6 and 14 may be embodied as various numbers of hardware, software and/or firmware structures that execute respective functions described above, according to example embodiments. For example, at least one of the controllers, interfaces, modules, managers, engines, control logics, monitors, processors, switches, or other element may use a direct circuit structure, such as a memory, a processor, a logic circuit, a look-up table, etc. that may execute the respective functions through controls of one or more microprocessors or other control apparatuses. Also, at least one of the controllers, interfaces, modules, managers, engines, control logics, monitors, processors, switches, or other element may be specifically embodied by a module, a program, or a part of code, which contains one or more executable instructions for performing specified logic functions, and executed by one or more microprocessors or other control apparatuses. Also, at least one of the controllers, interfaces, modules, managers, engines, control logics, monitors, processors, switches, or other element may further include or may be implemented by a processor such as a central processing unit (CPU) that performs the respective functions, a microprocessor, or the like. Two or more of the controllers, interfaces, modules, managers, engines, control logics, monitors, processors, switches, or other element may be combined into one single component, element, module or unit which performs all operations or functions of the combined two or more of controllers, interfaces, modules, managers, engines, control logics, monitors, processors, switches, or other element. Also, at least part of functions of at least one of the controllers, interfaces, modules, managers, engines, control logics, monitors, processors, switches, or other element may be performed by another of these components. Further, although a bus is not necessarily illustrated in each of the above block diagrams, communication between the components may be performed through the bus. Functional aspects of the above example embodiments may be implemented in algorithms that execute on one or more processors. Furthermore, the controllers, interfaces, modules, managers, engines, control logics, monitors, processors, switches, or other element represented by a block or processing steps may employ any number of related art techniques for electronics configuration, signal processing and/or control, data processing and the like.

While example embodiments have been described with reference to the accompanying drawings, it will be apparent to those skilled in the art that modifications and variations could be made without departing from the scope of the present disclosure.

What is claimed is:

1. A method comprising:
providing a storage device which comprises a first component and a second component, the second component comprising a non-volatile memory;
controlling a learning operation of a machine learning module by providing previously collected log data corresponding to the first component and the second component to an input layer of the machine learning module;
receiving, via a host interface of the storage device, a data read command from an external device;
accessing the non-volatile memory based on the data read command;
generating first log data comprising information about the first component and second log data comprising information about the second component;
providing the first log data and the second log data to the input layer of the machine learning module;
obtaining failure possibility information about the storage device from an output layer of the machine learning module, the failure possibility information indicating a plurality of failure possibilities respectively corresponding to a plurality of time windows;
receiving, via the host interface, a Get Log Page command including a log identifier indicating to request the failure possibility information about the storage device from the external device; and
providing, via the host interface, the failure possibility information indicating the plurality of failure possibilities to the external device in response to the Get Log Page command for requesting the failure possibility information about the storage device.

2. The method of claim 1, wherein the Get Log Page command is provided from a host device using a non-volatile memory express (NVMe) interface.

3. The method of claim 2, wherein the log identifier of the Get Log Page command is one of C0 to FF.

4. The method of claim 1, wherein the failure possibility information comprises information about a first status or a second status of the storage device.

5. The method of claim 4, wherein the first status indicates an urgent status, and the second status indicates a non-urgent status.

6. The method of claim 5, wherein the failure possibility information comprises information about the first status, the second status, a third status, a fourth status or a fifth status of the storage device,
wherein the third status indicates a low status in which failure possibility is low,
wherein the fourth status indicates a medium status in which the failure possibility is higher than the third status, and
wherein the fifth status indicates a high status in which the failure possibility is higher than the fourth status and lower than the first status.

7. The method of claim 1, wherein the first log data comprises k entries,
wherein the second log data comprises r entries,
wherein the providing the failure possibility information about the storage device comprises:
generating first failure possibility information about the first component based on p entries of the first log data;
generating second failure possibility information about the second component based on p entries of the second log data; and
generating the failure possibility information about the storage device based on the first failure possibility information and the second failure possibility information, and
wherein each of k, p and r is a natural number, p being smaller than k.

8. The method of claim 1, wherein the providing the failure possibility information about the storage device comprises:
generating first failure possibility information about the first component;
generating second failure possibility information about the second component; and
generating the failure possibility information about the storage device based on the first failure possibility information and the second failure possibility information,
wherein the first log data comprises k entries,
wherein the second log data comprises r entries,
wherein the generating the first failure possibility information comprises predicting a first failure possibility n times, each of which corresponds to a different time point, and is predicted based on p entries of the first log data included within a corresponding time window among the k entries of the first log data,
wherein the generating the second failure possibility information comprises predicting a second failure possibility n times, each of which corresponds to a different time point, and is predicted based on the p entries of the second log data included within a corresponding time window among the r entries of the second log data,
wherein the generating the failure possibility information about the storage device comprises multiplying the first failure possibility and the second failure possibility by a weighted vector for each of the first component and the second component for each of n time windows, and
wherein each of k, n, p and r is a natural number, p being smaller than k.

9. The method of claim 1, further comprising determining whether a number of collected log data is larger than a predetermined number,
wherein the obtaining the failure possibility information is performed based on the determining indicating the number of collected log data is larger than the predetermined number.

10. A method for operating a host device, the method comprising:
transmitting a data read command to a storage device to control the storage device to access a non-volatile memory;
receiving data corresponding to the data read command from the storage device;
transmitting a Get Log Page command including a log identifier indicating to request failure possibility information about the storage device to the storage device, wherein the storage device comprises a first component and a second component;
receiving the failure possibility information about the storage device from the storage device in response to the Get Log Page command for requesting the failure possibility information about the storage device, the failure possibility information indicating a plurality of failure possibilities respectively corresponding to a plurality of time windows,
wherein the failure possibility information is generated by the storage device providing first log data comprising information about the first component and second log data comprising information about the second component to an input layer of a machine learning module, and obtaining the failure possibility information from an output layer of the machine learning module, and wherein the storage device controls a learning operation of the machine learning module by providing previously collected log data corresponding to the first component and the second component to the input layer of the machine learning module.

11. The method for operating the host device of claim 10, wherein the Get Log Page command for requesting the failure possibility information about the storage device is transmitted to the storage device using a non-volatile memory express (NVMe) interface.

12. The method for operating the host device of claim 11, wherein the log identifier of the Get Log Page command is one of C0 to FF.

13. The method for operating the host device of claim 10, wherein the failure possibility information comprises information about a first status, a second status, a third status or a fourth status of the storage device.

14. The method for operating the host device of claim 10, wherein the receiving the failure possibility information about the storage device comprises:
receiving first failure possibility information about the first component of the storage device;
receiving second failure possibility information about the second component of the storage device; and
identifying the failure possibility information about the storage device based on the first failure possibility information and the second failure possibility information.

15. The method for operating the host device of claim 10, further comprising:
identifying a RAID rebuilding timing of the storage device based on the failure possibility information of the storage device; and
performing RAID building based on the RAID rebuilding timing.

16. A storage device comprising:
a buffer memory configured to temporarily store data provided from a host device;
a non-volatile memory configured to store the data provided from the host device;
a processor configured to:
control a log monitor to collect log data from the buffer memory and the non-volatile memory;
access the non-volatile memory based on a data read command received from the host device;
generate first log data comprising information about the buffer memory and second log data comprising information about the non-volatile memory;
implement a machine learning module that identifies a failure possibility about the storage device based on the log data;
control a learning operation of the machine learning module by providing previously collected log data corresponding to the buffer memory and the non-volatile memory to an input layer of the machine learning module;
provide the first log data and the second log data to the input layer of the machine learning module;
obtain failure possibility information indicating a plurality of failure possibilities respectively corresponding to a plurality of time windows from an output layer of the machine learning module;
receive a Get Log Page command including a log identifier indicating to request the failure possibility information; and
provide the plurality of failure possibilities to the host device in response to the Get Log Page command requesting the failure possibility information.

17. The storage device of claim 16, wherein the first log data comprises k entries,
wherein the second log data comprises r entries,
wherein the processor is further configured to:
identify a first failure possibility corresponding to the buffer memory based on p entries of the first log data;
identify a second failure possibility corresponding to the non-volatile memory based on p entries of the second log data; and
identify the failure possibility of the storage device based on the first failure possibility and the second failure possibility, and
wherein each of k, p and r is a natural number, p being smaller than k.

18. The storage device of claim 16, wherein the second log data collected from the non-volatile memory indicates a reclaim count performed in the non-volatile memory.

19. The storage device of claim 16, wherein the second log data collected from the non-volatile memory includes a read retry count performed in the non-volatile memory.

20. The storage device of claim 16, wherein the first log data collected from the buffer memory and the second log data collected from the non-volatile memory are stored in the non-volatile memory.

* * * * *